US010024571B2

(12) United States Patent
Seitz et al.

(10) Patent No.: US 10,024,571 B2
(45) Date of Patent: Jul. 17, 2018

(54) TANKLESS WATER HEATER

(71) Applicant: David E. Seitz, San Antonio, TX (US)

(72) Inventors: David E. Seitz, San Antonio, TX (US); James Dabney, Houston, TX (US); Louis Everett, El Paso, TX (US); Thomas L. Harman, Houston, TX (US)

( * ) Notice: Subject to any disclaimer, the term of this patent is extended or adjusted under 35 U.S.C. 154(b) by 0 days.

(21) Appl. No.: 15/845,039

(22) Filed: Dec. 18, 2017

(65) Prior Publication Data

US 2018/0106497 A1 Apr. 19, 2018

Related U.S. Application Data

(63) Continuation of application No. 15/412,816, filed on Jan. 23, 2017, now Pat. No. 9,874,373, which is a (Continued)

(51) Int. Cl.
*H05B 3/78* (2006.01)
*F24H 9/00* (2006.01)
(Continued)

(52) U.S. Cl.
CPC ......... *F24H 1/102* (2013.01); *F24D 17/0089* (2013.01); *F24H 1/202* (2013.01);
(Continued)

(58) Field of Classification Search
CPC .. H05B 3/78; H05B 3/48; F24H 1/202; F24H 9/0015; F24H 9/1818; F24H 1/10; F24H 1/14; F24D 17/0089; B60H 1/00; G05D 23/00
USPC ............... 219/481, 483, 494, 497, 506, 523; 122/4 A, 40, 13.01–19.2; 392/441, 444, 392/447–449, 451, 453, 465, 485, 486, 392/488, 490, 492; 237/2 A
See application file for complete search history.

(56) References Cited

U.S. PATENT DOCUMENTS

| | | | |
|---|---|---|---|
| 3,370,154 | A | 2/1968 | Fuchslocher |
| 3,591,131 | A | 7/1971 | Carlson |

(Continued)

FOREIGN PATENT DOCUMENTS

| | | | |
|---|---|---|---|
| CN | 101398219 | A | 4/2009 |
| WO | 03004939 | A1 | 1/2003 |

OTHER PUBLICATIONS

Manley, Nicholas Michael, European Search Report, dated Aug. 28, 2015, European Patent Office.

(Continued)

*Primary Examiner* — Michael Laflame, Jr.
(74) *Attorney, Agent, or Firm* — Gunn, Lee & Cave, PC

(57) ABSTRACT

A water heater (10) is suitable for point-of-use applications. The water heater includes a first temperature sensor, a second temperature sensor, and a controller connected to the first and second temperature sensors. The controller is configured to receive the signals generated by the first temperature sensor and the second temperature sensor and to detect a flow condition of water within the heat without using mechanical flow detection means and without supplying stand-by heating by adding an absolute value of the sensed change in temperature of water at the first temperature sensor to the absolute value of the sensed change in temperature of water at the second temperature sensor to yield a sum and then comparing the sum to a reference temperature.

2 Claims, 9 Drawing Sheets

Related U.S. Application Data continuation of application No. 14/877,513, filed on Oct. 7, 2015, now Pat. No. 9,664,413, which is a continuation of application No. 13/274,930, filed on Oct. 17, 2011, now Pat. No. 9,167,630.

(51) Int. Cl.

| | |
|---|---|
| ***G05D 23/00*** | (2006.01) |
| ***F24H 1/10*** | (2006.01) |
| ***H05B 3/82*** | (2006.01) |
| ***F24H 9/20*** | (2006.01) |
| ***F24H 9/18*** | (2006.01) |
| ***F24H 1/20*** | (2006.01) |
| ***F24D 17/00*** | (2006.01) |

(52) U.S. Cl.

CPC ......... *F24H 9/0021* (2013.01); *F24H 9/1818* (2013.01); *F24H 9/2028* (2013.01); *H05B 3/78* (2013.01); *H05B 3/82* (2013.01); *F24H 2250/02* (2013.01); *H05B 2203/021* (2013.01)

(56) References Cited

U.S. PATENT DOCUMENTS

| | | | |
|---|---|---|---|
| 3,617,700 | A | 11/1971 | Hooper |
| 4,185,187 | A | 1/1980 | Rogers |
| 4,387,691 | A | 6/1983 | Marcoux et al. |
| 4,414,464 | A | 11/1983 | Cloutier |
| 4,565,121 | A | 1/1986 | Ohya et al. |
| 4,604,515 | A | 8/1986 | Davidson |
| 4,959,526 | A | 9/1990 | Kurachi et al. |
| 5,216,743 | A | 6/1993 | Seitz |
| 5,216,746 | A | 6/1993 | Yoshizawa et al. |
| 5,371,831 | A | 12/1994 | Gauer |
| 5,408,578 | A | 4/1995 | Bolivar |
| 5,724,478 | A | 3/1998 | Thweatt |
| 5,866,880 | A | 2/1999 | Seitz et al. |
| 6,080,971 | A | 6/2000 | Seitz et al. |
| 6,175,689 | B1 | 1/2001 | Blanco |
| 6,246,831 | B1 | 6/2001 | Seitz et al. |
| 6,574,426 | B1 | 6/2003 | Blanco |
| 6,909,842 | B2 | 6/2005 | Dufour |
| 6,909,843 | B1 | 6/2005 | Fabrizio |
| 6,920,844 | B1 | 7/2005 | Ismert |
| 7,164,851 | B2 | 1/2007 | Sturm |
| 7,567,751 | B2 | 7/2009 | Fabrizio |
| 7,570,877 | B1 | 8/2009 | Huang |
| 7,616,873 | B1 | 11/2009 | Seitz |
| 7,779,790 | B2 | 8/2010 | Fabrizio |
| 7,820,949 | B2 | 10/2010 | Sasaki et al. |
| 7,945,146 | B2 | 5/2011 | Cabrera |
| 8,733,400 | B2 | 5/2014 | Muggli et al. |
| 2002/0015585 | A1 | 2/2002 | Jensen |
| 2007/0227468 | A1 | 10/2007 | Gordon et al. |
| 2010/0034528 | A1 | 2/2010 | Willis et al. |
| 2010/0272582 | A1 | 10/2010 | Grenon |
| 2012/0145807 | A1 | 6/2012 | Martinez |

OTHER PUBLICATIONS

PCT "Notification of Transmittal of the International Search Report and the Written Opinion", dated Jan. 18, 2013, 12 pages.

TANKLESS WATER HEATER

CROSS REFERENCES TO RELATED APPLICATIONS

This continuation application claims priority to and the benefit of U.S. application Ser. No. 15/412,816, filed Jan. 23, 2017 which is a continuation of U.S. application Ser. No. 14/877,513, filed Oct. 7, 2015 (now U.S. Pat. No. 9,664, 413), which is a continuation of U.S. application Ser. No. 13/274,930, filed Oct. 17, 2011 (now U.S. Pat. No. 9,167, 630). Each of these prior filed applications are incorporated by reference.

FEDERALLY SPONSER RESEARCH

Not applicable.

BACKGROUND OF THE INVENTION

1. Field of the Invention

The present invention relates to water heaters, and more particularly to a "tankless" water heater with an electrically powered heating element and a relatively small tank for substantially instantaneous heating of the water.

2. Description of the Related Art

Various types of tankless water heaters have been devised over the years, including water heaters with electrically powered heating elements in a plastic housing. Tankless water heaters have frequently been directed to point of use, meaning the water heater was placed immediately upstream from a heated water use device, such as a sink or a shower.

Several tankless water heater manufacturers provide multiple water housings, which may be plumbed in parallel and/or in series. Another manufacturer employs a single metal tank for receiving the electrically powered heater. The water inlet to the one or more housings and the water outlet from the one or more housings typically have reduced diameters of ⅜ inch tubing. This restricted tubing in part tends to create a high fluid velocity in portions of the tank to entrain air bubbles in the fluid passing to the outlet, thereby attempting to avoid undesirable air pockets within the housing chamber. Moreover, restricted inlets and outlets create a high pressure drop such that the unit may not be suitable for various applications. Water outlets from many heaters extend from the bottom of the tank housing.

Prior art tankless water heaters have disadvantages in that the mounting orientation of the water heater is limited; most heaters must be mounted with the central tank axis vertical. Many prior art tankless water heaters subject the user to a scalding condition when latent heat after shut-down causes water hotter than desired to remain in the housing chamber after the heater is shut off After shut off, water temperature continues to increase in the housing due to the heated surroundings and the still hot heating element, and overheated hot water is subsequently released when the same or another user turns the water back on. Other tankless water heaters contain very little water, and the second user of the water does not benefit from the stored quantity of water in the heater after the first use is completed. Still other tankless water heaters use expensive flow control sensors or do not accurately detect a "flow" condition, thereby minimizing the effective control of heat to the water. Some tankless water heaters incorporate mixing valves to mix hot water discharged from the heater, thereby creating another expense to the user.

Prior art patents include U.S. Pat. Nos. 5,216,743, 7,616, 873, 5,866,880, 6,080,971, and 6,246,831. U.S. Pat. Nos. 5,216,743, 5,866,880, 6,080,971, 6,246,831, and 7,616,873 disclose tankless water heaters with a plastic housing and improved heater controls. U.S. Pat. Nos. 6,909,843, 7,567, 751 and 7,779,790 disclose a single chamber heater with one or more heating elements therein.

The disadvantages of the prior art are overcome by the present invention, an improved tankless water heater is hereinafter disclosed.

SUMMARY OF THE INVENTION

In one embodiment, the water heater includes a generally cylindrical tank housing having an internal diameter and a central tank axis. One or more electrically powered heating elements are positioned within the interior chamber for heating water. A water inlet line extends from outside the tank housing to an elongate inlet port in the tank housing, and a water outlet line extends from two or more outlet ports, with a first outlet port in an upper portion of the tank and a second port spaced below the first outlet port. A flow diverter within the interior chamber is in fluid communication with the second outlet port, particularly when the tank axis is horizontal. The flow diverter inlet is below the first outlet port, so that warm water from the second outlet port mixes with hotter water from the elevated first outlet port.

These and further features and advantages of the present invention will become apparent from the following detailed description, wherein reference is made to the figures in the accompanying drawings.

DETAILED DESCRIPTION OF PREFERRED EMBODIMENTS

Figure 1:
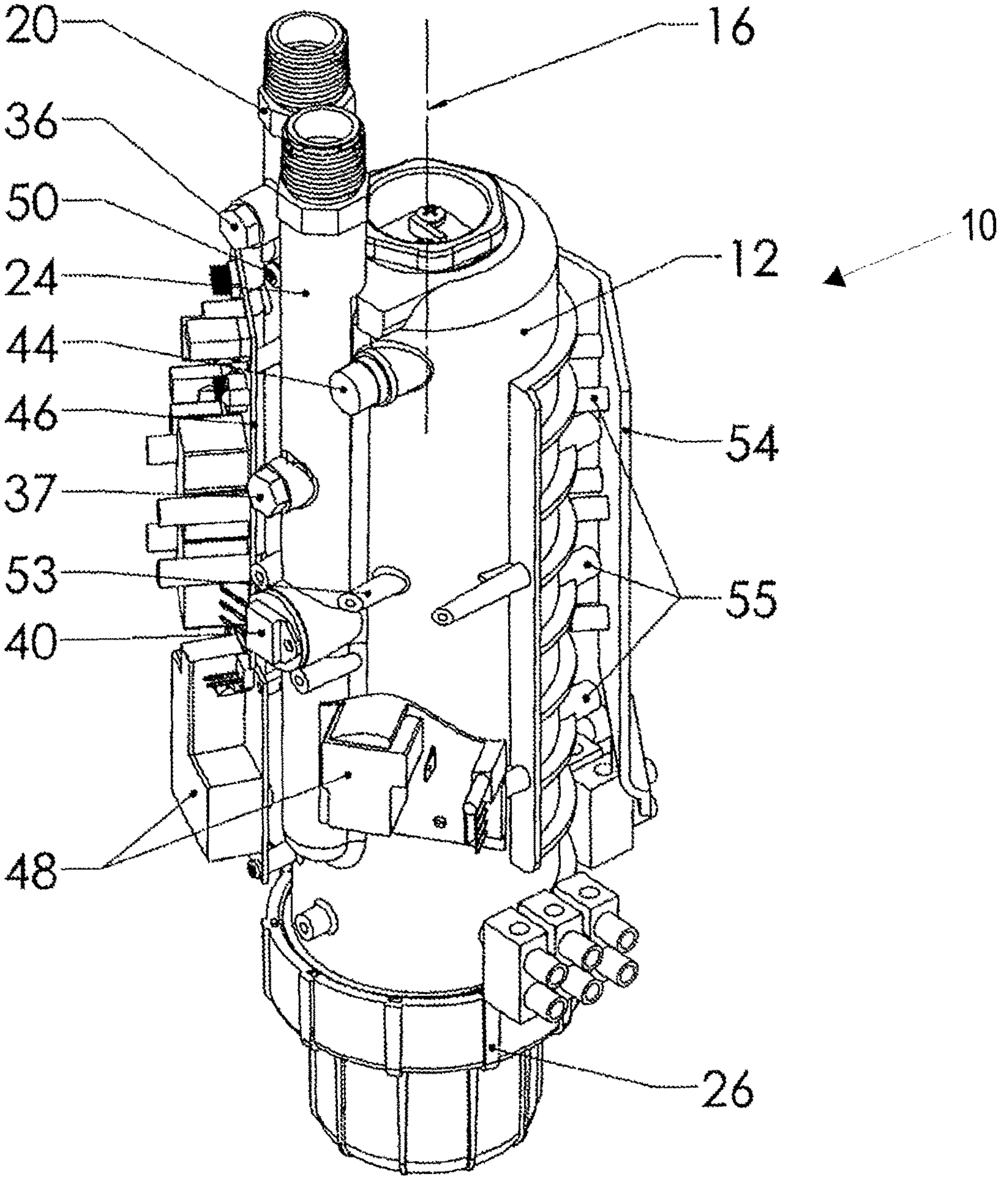
FIG. 1 is an isometric view of a tankless water heater.
Figure 4:
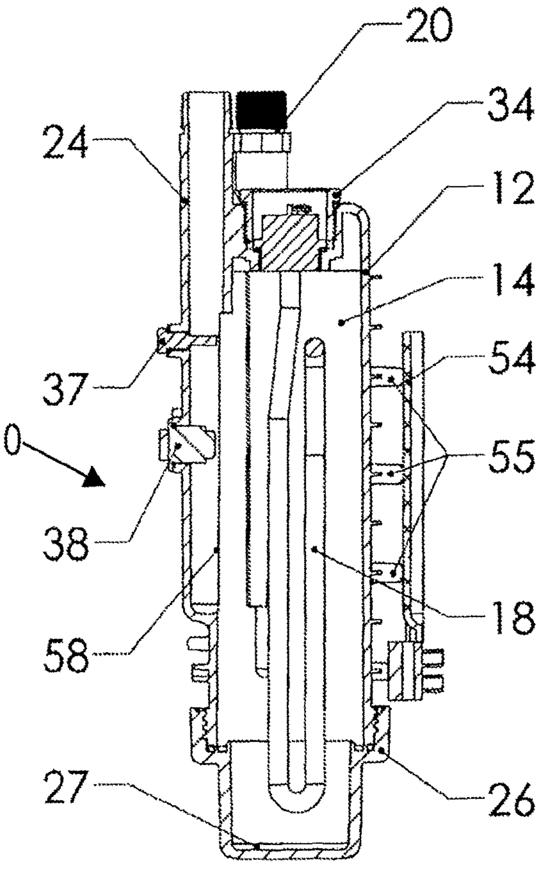
FIG. 4 is a cross-sectional view of the heater shown in FIG. 3.

One embodiment of the tankless water heater 10 as shown in FIG. 1 includes a generally cylindrical tank housing 12 having an internal chamber therein and a central tank axis 16. As disclosed subsequently, one or more electrically powered heating elements are provided within the internal chamber for heating water. The water inlet line 24 has a first axis 25 parallel to the tank axis 16 and extends from outside the tank housing 12 to an inlet port in the tank housing, while a water outlet line 20 having a second axis 21 parallel to the tank axis 16 extends from two spaced outlet ports in the tank housing. A first plane P1 intersects and is parallel to the first axis 25 and the second axis 21, while a second plane P2 is parallel to the first plane P1 and intersects the tank axis 16. Various mounting bosses 53 for the printed circuit board may be provided exterior of the tank housing for mounting electrical circuits and other components, such as electrical controller 48. The cover mounting bosses 55 extend radially outward from the lower part of the housing 12 and preferably are unitary with the housing 12, as shown in FIG. 4. Mounting board 54 is also shown supported on cover mounting bosses 55. Base cap 26 is shown at the lower end of the heater in FIG. 1.

Figure 2:
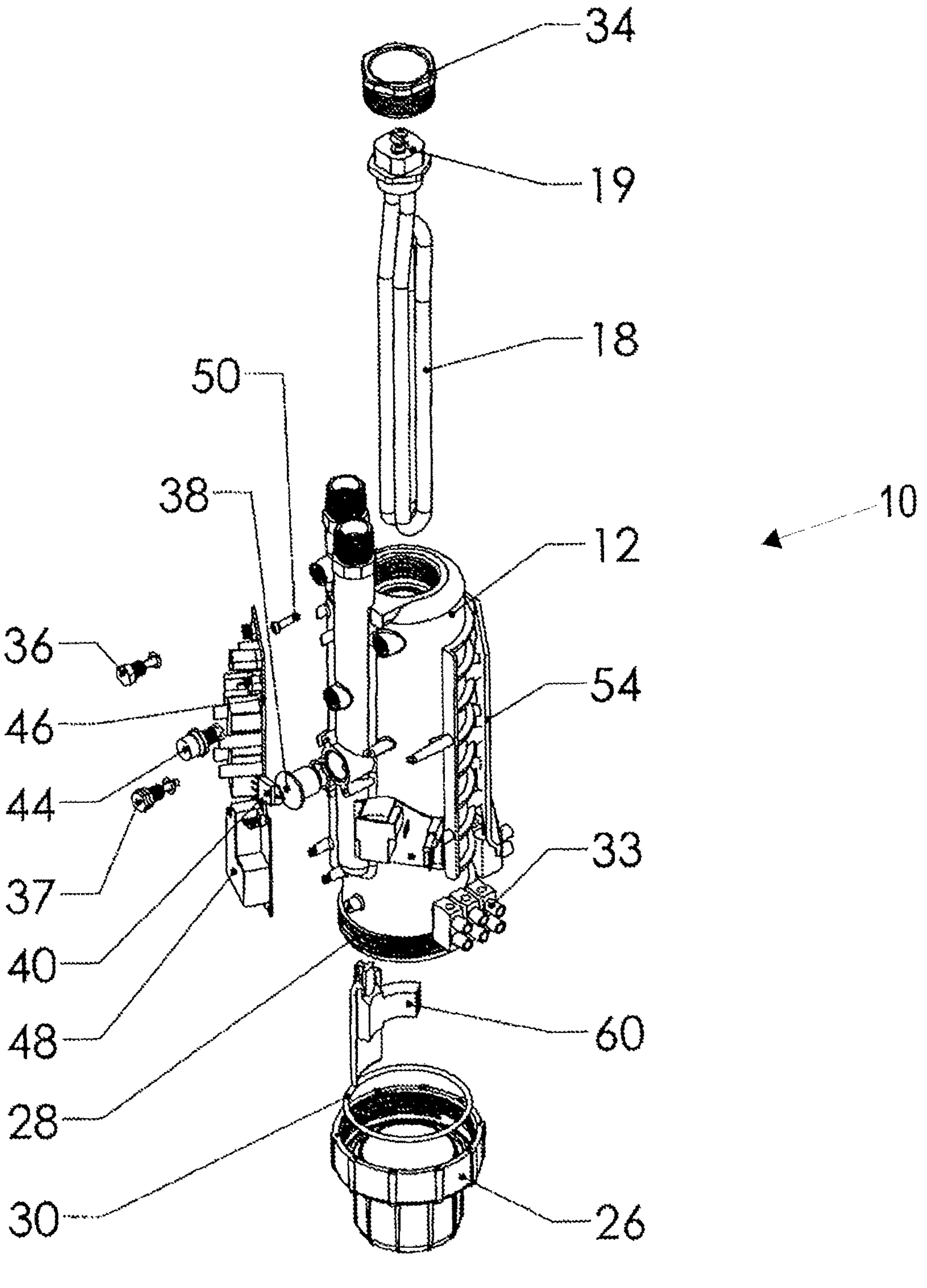
FIG. 2 is an exploded view of the heater shown in FIG. 1.

Referring now to FIG. 2, a base cap 26 has internal threads for mating with external threads 28 on the tank housing, with an o-ring 30 sealing between cap 26 and housing 12. A diverter 60 having an entry port 65 is positioned within the internal chamber in the tank housing. The entry port 65 is on the opposing side of the second plane P2 from the water outlet line 20. The is discussed further below.

The heater includes one or more electrically powered heating elements 18 for heating water within the internal chamber 14 (see FIG. 4) in the housing 12. The chamber 14 is preferably generally cylindrical, with a chamber axis aligned with the central tank axis 16, as shown in FIG. 1. Electrical power to the heating element 18 as shown in FIG. 2 is provided through terminals on the head 19 of the heating element. The heating element may be supported by ring cap or gland 34, which may be threaded to the top of the tank housing. Other components of the water heater as shown in FIG. 2 include inlet thermistor 37 and outlet thermistor 36, a heat sink plug 38, triac 40, terminal block 33 attached to one or more bosses, high limit temperature switch 44, controller 46 (e.g., PCB logic board), and relay 48. A water level detect screw 50 may be used to detect the fluid level (presence or absence of fluid at that level) near the top of the chamber. Signals from this sensor are input to the controller for the purpose of detecting and verifying fluid levels. Fluid flows past the heat sink to cool the control switches which are activated when heat is required. Suitable seals may be provided for sealing components with the housing sidewall.

Figure 3:
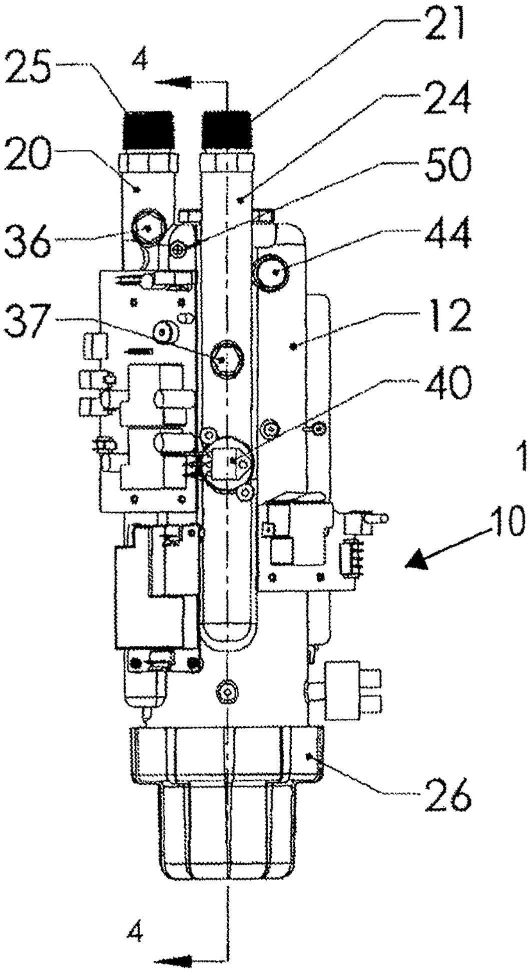
FIG. 3 is a side view of the heater shown in FIG. 1.

FIG. 3 is a side view of the assembly shown in FIG. 2. FIGS. 3 and 4 illustrate the base cap 26, which has a lowermost surface 27 (see FIG. 4) appreciably below the bottom of the housing 12, thereby allowing the heating element 18, if desired, to extend below the housing 12 and into the lowermost axially extending cavity provided in the base cap 27. A standard base cap with a lower surface substantially at the level of a lower end of the housing may thus be used if the heating element 18 is shorter than as shown in FIG. 4, and a cap 26 with a deeper cavity may be used for receiving a heating element longer than shown in FIG. 4, while continually maintaining the overall structure of the housing 12 and components attached thereto. FIG. 3 illustrates that the inlet threaded nipple 21 to line 24 and outlet threaded nipple 25 from line 20 are each at a level substantially above the upper end of the housing 12 when mounted with its axis vertical, thereby reducing the likelihood of a connection leak compared, for example, to a flow line which is threadably connected directly to the housing 12. Each of fluid inlet line 24 and fluid outlet line 20 have an interior diameter preferably greater than 0.6 inches. Lines 20 and 24 have a respective inlet and outlet spaced at least 50% of the diameter of internal chamber 14 from any portion of the tank housing. The cylindrical tank housing has an interior chamber diameter greater than 2.0 inches. FIG. 4 also depicts the triac 40 shown in FIG. 2, and thermistor 36 and inlet line 20.

FIG. 4 discloses the fluid inlet line 20 having an elongate fluid disbursement slot 58 which provides communication between the inlet line and the interior of the chamber. Desirably, the incoming water is input to the interior chamber along an axial path of fluid disbursement slot 58 which is in excess of 40% of the axial length of the interior chamber, thereby contributing to both good mixing of the incoming water and any heated water already in the chamber, and even heating along the axis of the heating element to which the fluid is directed. The elongate fluid disbursement slot 58 allows the inlet water to be evenly dispersed over the top of the heater and will be rapidly preheated by water previously heated by the last user and retained in the upper portion of the chamber, thereby using this hot water (hot spot water) not only to preheat the incoming water, but also to cool the hot spot water to assist in preventing scalding water. The fluid disbursement slot 58 distributes water to both the upper portion and the lower portion of the internal chamber 14. The elongate fluid disbursement slot 58 also preferably distributes water along a majority of the axial length of the heating element for better distribution of heat transfer to fluid within the chamber.

Figure 5:
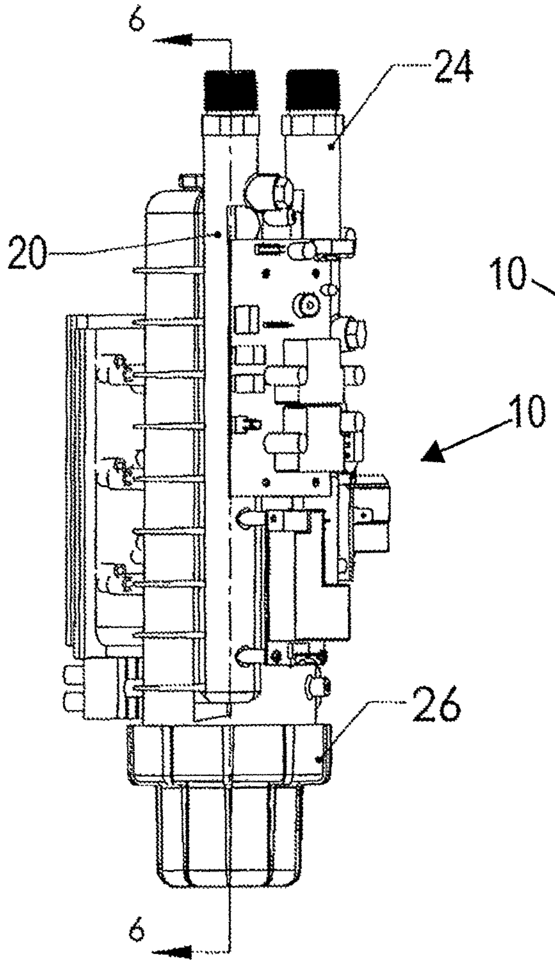
FIG. 5 is another side view of the heater shown in FIG. 1.
Figure 6:
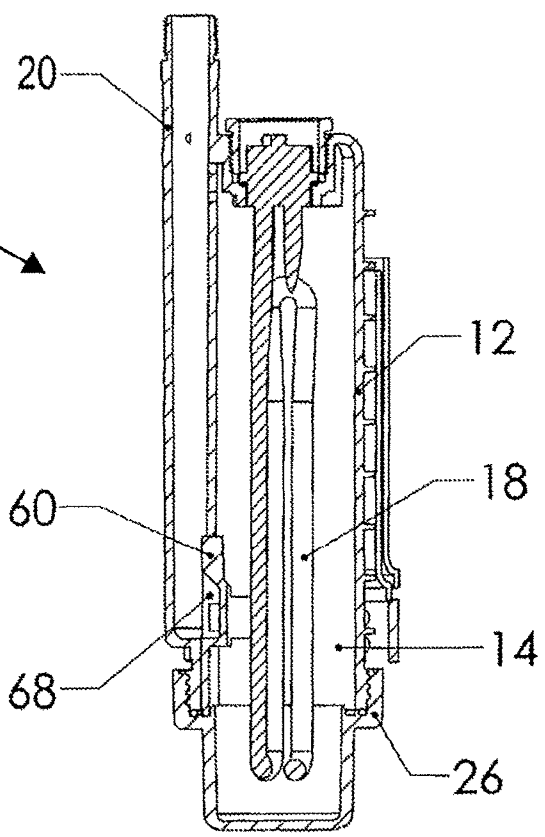
FIG. 6 is another cross-sectional view of the heater shown in FIG. 5.
Figure 14:
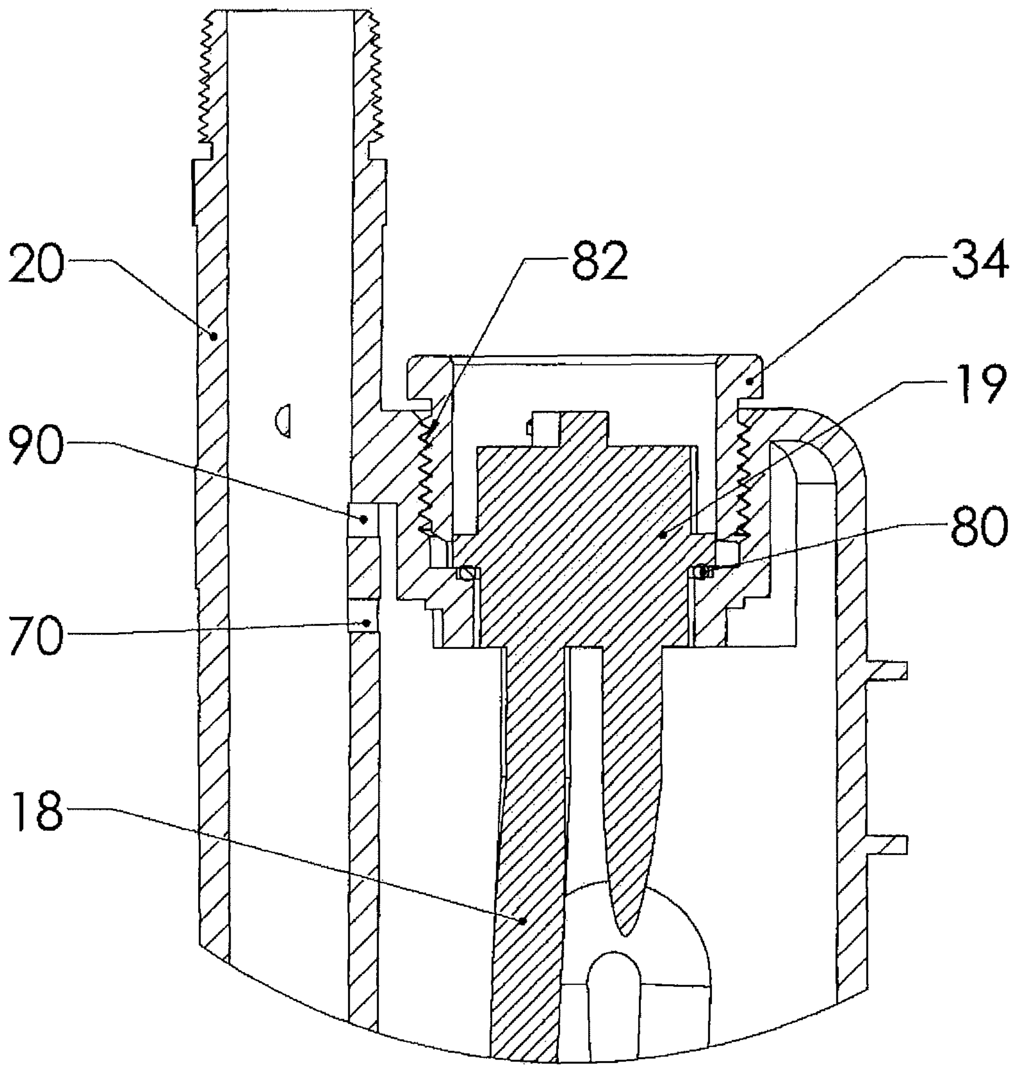
FIG. 14 is an enlarged view of the upper portion of the housing shown in FIG. 6.

FIG. 5 shows the same heater with fluid inlet line 24 and fluid outlet line 20 each integral with the housing 12. FIG. 6 is a cross-section through the fluid outlet line and the internal chamber 14 within the heater housing 12, and illustrates diverter 60. The diverter 60 diverts and controls the percent of cooler fluid introduced from the lower outlet and thus the lower portion of the chamber with the hotter fluid from the upper outlet and thus the upper portion of the chamber, such that the resulting outlet water will not exceed minimum scalding temperature. The diverter 60 controls the entry of fluid into a lower end of the outlet line 20. The upper aperture 70, as shown in FIG. 14, draws hotter fluid from the upper portion of the chamber to pass directly into the outlet line 20 for mixing with the cooler fluid drawn the lower portion of the chamber.

Vent hole 90 vents noncondensible gas/air from the internal chamber 14 to the outlet line 20. Only a small vent hole having an exemplary diameter of 3⁄16 inch or less is required to reliably vent noncombustible gas/air from the chamber to the discharge or outlet line 20. Changing the size of the upper outlet aperture 70 controls the ratio of the mixing of warm water from the diverter with hotter water from the aperture 70. A smaller aperture 70 thus provides a greater degree of protection against scalding. The size of the aperture 70 may thus depend upon the application and the need to minimize scalding for that application.

Figure 7:
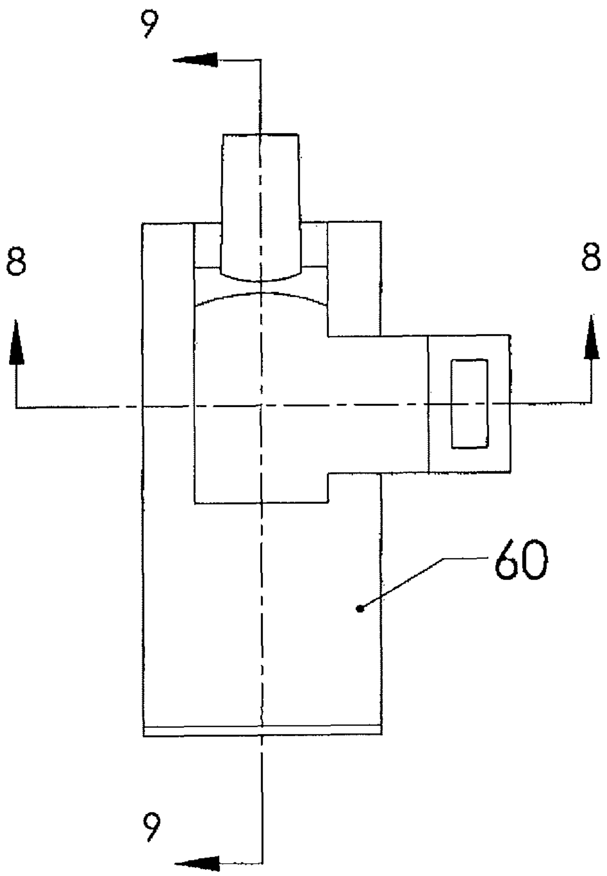
FIG. 7 is a side view of a suitable diverter.
Figure 9:
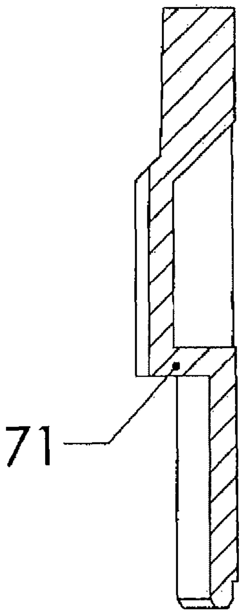
FIG. 9 is another cross-sectional view of the diverter shown in FIG. 7.
Figure 8:
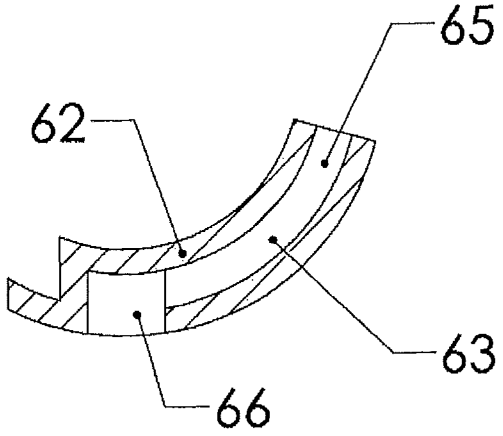
FIG. 8 is a cross-sectional view of the diverter shown in FIG. 7.
Figure 13:
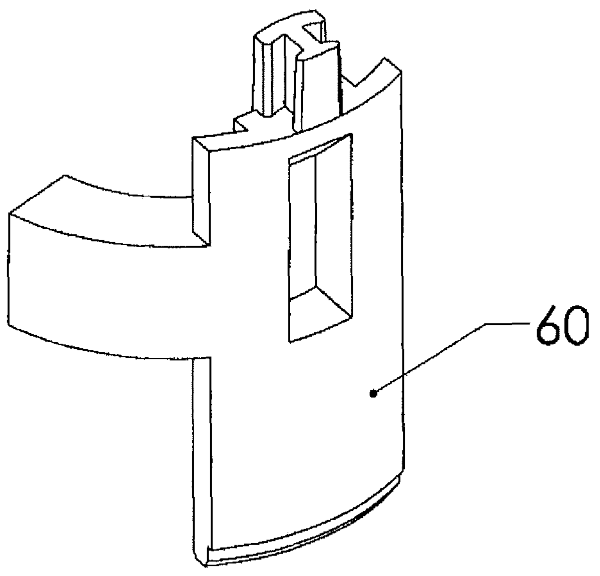
FIG. 13 is an isometric view of the diverter shown in FIG. 7.

FIG. 7 is a side view of a suitable diverter 60, which serves as a fluid outlet and controls the volume of water from the lower outlet aperture and thus the lower portion of the outlet line. The diverter thus diverts and controls the volume of cooler water introduced from the lower portion of the chamber through the diverter 60, which has a vertical cross-section body 71 as shown in FIG. 9 and a horizontal cross-section 62 as shown in FIG. 8. The diverter's horizontal cross-section includes entry port 65 which delivers fluid to a curved flow path 63, which connects at diverter outlet to chamber 66, which in turn is in fluid communication with the lower outlet aperture 68 (see FIG. 6) in the housing and thus the interior of the outlet line 20. The diverter 60 thus sits against the curved inner sidewall of the housing, and diverts fluid from either above and/or below the diverter and adjacent the housing interior sidewall into the outlet line 20, with the lower outlet aperture 68 being in a lower portion of the chamber when the housing axis 16 is vertical. When the axis of the housing is horizontal, which is an alternative mounting technique, the diverter 60 as shown in FIGS. 7-9 takes water from a lower or midsection portion of the chamber (which is inherently cooler than water in the uppermost part of the chamber), and similarly diverts that water through the channel 63 into the outlet line 20. Since hot water in a chamber rises and cold water sinks, "hot spots" of elevated temperature water from the hot heater element (even when turned off) rise to the top of the chamber. A pictorial view of the diverter 60 is shown in FIG. 13.

As briefly discussed above, the heater may be vertically mounted so that the central housing axis 16 is substantially vertical, or may be horizontally mounted so that the central housing axis 16 is substantially horizontal. For the vertical mounting application, water passes from the inlet line through the fluid disbursement slot 58, which is preferably is a substantially vertical slot, and thus inputs cold water along a substantial length of the inner chamber in the housing and thus directed across a substantial portion of the length of the heating element. Lower outlet aperture 68, as shown in FIG.6, is in a lower portion of the housing, and thus draws water from the lower portion of the chamber. Water passing from the chamber through the lower outlet aperture 68 is thus typically cooler, and may be appreciably cooler, than water in the upper portion of the chamber due to convection and stratification of the hotter water. This is particularly true at heater start up after a previous use. Water from the lower outlet aperture 68 thus mixes in the outlet line 20 with hotter water from the upper outlet aperture 70, and this mixing desirably reduces scalding, particularly under circumstances where water is passing through the heater when the user shuts off the water. Upper outlet 70 normally has a smaller cross-sectional area than lower outlet 68. Because of latent heat in the heating element, scalding is particularly problematic in the use of a tankless water heater due to the relatively high wattage elements compared to low volume of total fluid in the heater, which has a tendency to raise the temperature in an upper part of the chamber (whether vertically or horizontally mounted) above the desired set point, while the water in a lower portion of the heater is lowering in temperature as the temperature stratifies in the chamber. Most water heaters draw water from the hottest portion of the chamber, and when the same or another user turns on the water, the user may be scalded. By drawing at least some portion of the water from the lower end of the chamber, the likelihood of scalding is substantially reduced. Positioning the upper hole 70 within 20% of the uppermost part of the chamber, and positioning the lower hole 68 within 20% of the lowermost part of the chamber enhances the repeatability of water at a desired temperature exiting the unit, compared, for example, to hole 70 being above but spaced within 2 inches of hole 68.

For a horizontal mounting application, water in the inlet line passes through the fluid disbursement slot 58, which in this case is a substantially horizontal slot, to input water along a substantial horizontal length of the chamber and heating element in the housing. Lower outlet aperture 68 as shown in FIG. 6 is not in a lower portion of the housing, but the diverter 60 when used with the horizontal mount application assures that water is drawn off the lower portion of the horizontal chamber, since in the horizontal mount application, the inlet to the diverter is below the hole 68, and thus receives cooler water than water in the upper portion of the chamber. Thus water in a lower portion of the chamber is drawn and mixed with water from the upper portion of the chamber, as with the vertical mount application. Water from the upper portion of the chamber may pass through the upper outlet aperture 70 to the outlet line, and is mixed with the cooler water from the lower portion of the chamber to again prevent scalding. Although only outlet apertures 70 and 68 are shown, one or more additional outlet ports could be provided between chamber 14 and line 20.

For the horizontal mount application, the fluid inlet 58 to the chamber and the upper outlet aperture 70 from the chamber are preferably at substantially the same elevation, so that at startup of the unit, cool incoming water from fluid inlet 58 mixes with the hot water adjacent upper outlet aperture 70 to minimize scalding. Each of the fluid disbursement slot 58 and the water upper outlet aperture 70 are preferably provided within at least the upper third of the horizontally mounted chamber, while the lower outlet aperture 68 is in the lower portion of the chamber. Preferably the fluid disbursement slot 58 and the upper outlet aperture 70 are at substantially the same elevation, and in most applications the difference in their elevations will vary by less than ½ inch. Each of the inlet line 24 and the outlet line 20 are preferably spaced in a 90° quadrant at the upper end of the horizontally mounted cylindrical housing. Effective control of the water temperature discharged from the unit is thus enhanced by mixing hot water in the upper portion of the chamber with cool water from the lower portion of the chamber.

The size of the flow through aperture in the diverter 60 and the size of the upper outlet aperture 70 may be selected to maximize the performance of the heater for each application. For example, the time to reach set point vs. scald potential may be balanced for the application. The heater allows one to easily accomplish this balance without a secondary mixing device. Once the heater has been used, there is storage of preheated water that allows the second user to instantaneously draw hot water within a period of an hour or longer.

Figure 11:
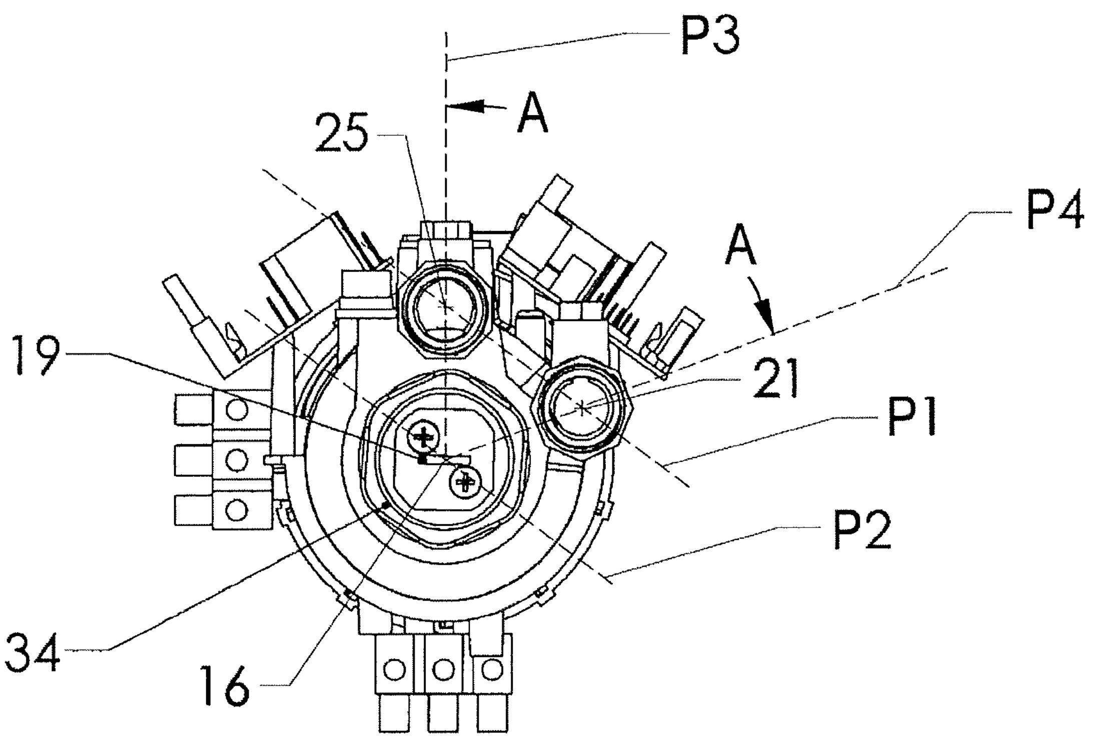
FIG. 11 is a top view of the heater shown in FIG. 1.

The vent hole 90 as shown in FIG. 14 functions as a vent hole to vent gas from the chamber to the outlet line 20 when the tank central axis is either vertical or horizontal. The vent hole 90 is thus desirably located so that when mounted vertically or horizontally, the hole is at the uppermost portion of the chamber. When the heater is horizontally mounted, the first aperture 70 is circumferentially positioned so that it draws water from the upper portion of the chamber and vents gas from the upper portion of the chamber, while the diverter 60 draws water from a lower portion of the chamber. When horizontally mounted, the inlet line 24 and the outlet line 20 are preferably within a horizontal plane (the axes 21, 25 of the two lines are in a single horizontal plane P1, as shown in FIG. 11), which allows mixing of the incoming water and water output through the upper output aperture 70. Lines 20 and 24 are also preferably spaced circumferentially within a quadrant of the tank housing so that both lines are in communication with an upper portion of chamber 19, whether vertically or horizontally mounted.

Figure 10:
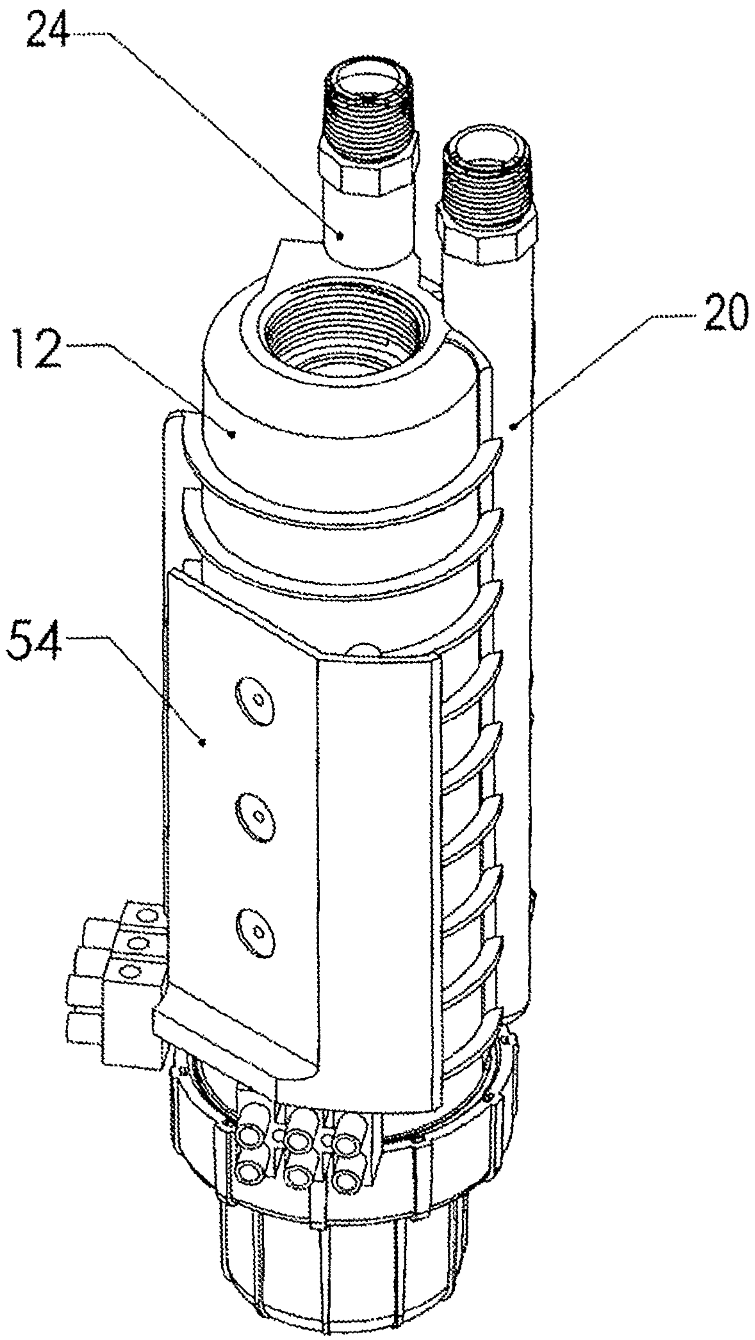
FIG. 10 is an isometric view of the heater housing.

FIG. 10 is a pictorial view of the housing 12 as well as the components which are integral with and homogeneous with the housing 12, including the inlet line 24, the outlet line 20, and mounting bosses 55 (see FIG. 1) for supporting wall mounting plate 54. By providing inlet and outlet lines which are integral with the housing, the number of leak paths to and from the heater are significantly reduced, and as previously noted the interconnection of a flow line to each of the inlet and outlet lines may desirably be made at a location spaced from the housing 12. The integral housing 12, inlet line 24, and outlet line 20 also provide strength and a significantly reduced likelihood of cracking or otherwise damaging components during the installation or repair of the heater, since the structural integrity of the combined housing and flow lines substantially reduces the likelihood of breaking one of the lines or its connection to the housing.

Figure 12:
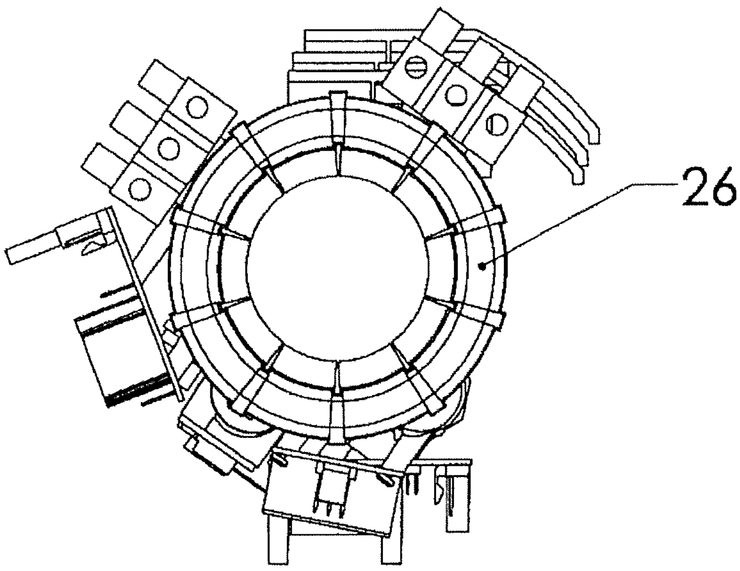
FIG. 12 is a bottom view of the heater shown in FIG. 1.

FIG. 11 is a top view of the heater as shown in FIG. 1, with the heating element ring cap or gland 34 positioned within the interior of the ring cap 34. FIG. 12 is a bottom view of the same heater, showing the base cap 26 and various electrical components supported on the housing 12. A third plane P3 intersects and is parallel to the first axis 25 and the tank axis 16, while a fourth plane P4 intersects and is parallel to the second axis 21 and the tank axis 16. The angle A between the third plane and the fourth plane is less than ninety degrees.

FIG. 14 is an enlargement of the upper portion of the housing shown in FIG. 6, and illustrates the upper outlet aperture 70 between the internal chamber 14 and the water outlet line 20. The upper outlet aperture 70 is provided in an uppermost portion of the chamber to release gases in the upper portion of the chamber, and also for passing heated fluid from the top of the chamber to the outlet line 20 to mix with the fluid from the lower hole in the outlet line which receives fluid from the diverter 60. A small amount of fluid from the inlet line 24 flows through the fluid disbursement slot 58 and directly into the upper portion of the chamber to mix with other fluid in the upper portion of the chamber and thereby prevent fluid in the chamber from overheating while water is flowing through the heater. Vent hole 90 as shown in FIG. 14 optionally may be provided between the upper portion of the chamber to vent gas to the water outlet line 20.

FIG. 14 also illustrates the threaded connection between the element ring cap 34 and the housing 12. Tightening the element ring cap 34 thus presses down on the flange of the head 19, thereby compressing the element seal 80. By providing the fluid tight element seal 80 between the chamber 14 and the element ring cap 34, threads 82 between the cap and the housing are protected from engagement with the fluid in the chamber and thus the chemical attack of hot fluid on the threads, thereby contributing to reliable sealing which is not obtained if the cap threads and the housing threads are exposed to the heated fluid.

A feature of the invention is the technique by which the controller determines that a "flow" condition exists, i.e., fluid is passing through the housing, which determination affects the operability of the heater. More particularly, the prior art heaters determined a flow versus a no flow condition based upon expensive detectors which respond directly to the flow of water, or based upon temperature sensors alone which in use do not reliably provide an indication of flow. According to the present invention, a flow determination is made by the controller based on an inlet temperature signal from a first sensor and an outlet temperature signal from a second sensor. More particularly, the controller 46 determines a flow condition based upon an absolute value of the change in the absolute value of the temperature sensed upstream from the inlet port, i.e., by thermistor 37 (see FIG. 2), and the change in the absolute value of the temperature sensed by thermistor 36 downstream from the upper outlet aperture 70. Applicant has discovered that the sum of the absolute value of the combined temperature change from these two sensors provides an accurate and substantially immediate determination of a flow condition, which may reliably be used by the controller, e.g., controller 46, to control power to the heating elements. Under normal "no flow" conditions, the change in temperature from the inlet temperature sensor and the outlet temperature sensor will be less than a selected reference temperature, so that the heater stays in the "stand-by" condition. When fluid flow starts, the controller 46 determines flow, typically within a few seconds, e.g., less than two seconds, based upon the absolute value of the change in the inlet temperature plus the change in absolute value of the outlet temperature, with the sum compared to a delta reference temperature. Flow may thus be determined without any mechanical flow detection means and without supplying any stand-by heating to the chamber to maintain the temperature difference between the inlet temperature and the outlet temperature.

The present heater may be used for point-of-use applications, meaning that the heater is installed closely adjacent, e.g., within ten feet, of the use. For a public laboratory application, the heater may be provided directly under each sink, or one heater may supply hot water to two or more sinks. For these applications, the size of the chamber which holds water is important, and for that size chamber there is a preferred power range for the heating element. More particularly, Applicant has determined that an instantaneous or "tankless" water heater preferably has an internal housing chamber of from 20 ounces to 80 ounces, with one or more electrically powered heaters in the chamber having combined power from 2 kilowatts to 10 kilowatts. The heater may also be used for "heat and boost" applications, wherein the heater as disclosed herein is provided with a preheated fluid and "boosts" the fluid temperature for a specific use. The heater may also be used for stand alone or a "whole house" heating application.

While the heater as disclosed herein is particularly well-suited for heating water, the heater may be used for heating other liquids, such as cleaning solutions. While the heater is particularly well-suited for heating liquid with one or more electrically powered heating elements, various concepts of the invention, including the use of spaced holes which combine in the fluid outlet to mix colder fluid with fluid, may be used for an instantaneous gas heater application.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

We claim:

1. A method of a detecting a flow condition within a water heater by using a first temperature sensor and a second temperature sensor downstream from the first temperature sensor, the method comprising the steps of:

receiving a first temperature signal from the first temperature sensor at a first moment in time, the first temperature signal being representative of a first temperature;

receiving a second temperature signal from the first temperature sensor at a second moment in time, the second temperature signal being representative of a second temperature;

receiving a third temperature signal from the second temperature sensor at the first moment in time, the third temperature signal being representative of a third temperature;

receiving a fourth temperature signal from the second temperature sensor at the second moment in time, the fourth temperature signal being representative of a fourth temperature;

subtracting one of the first temperature and the second temperature from the other of the first temperature and the second temperature to yield a first temperature difference;

subtracting one of the third temperature and the fourth temperature from the other of the third temperature and the fourth temperature to yield a second temperature difference;

comparing the sum of the absolute value of the first temperature difference and the absolute value of the second temperature difference to a reference temperature.

2. The method of claim 1 wherein the reference temperature is a delta reference temperature.

* * * * *